(12) United States Patent
Showen et al.

(10) Patent No.: US 7,474,589 B2
(45) Date of Patent: Jan. 6, 2009

(54) ACOUSTIC LOCATION OF GUNSHOTS USING COMBINED ANGLE OF ARRIVAL AND TIME OF ARRIVAL MEASUREMENTS

(75) Inventors: Robert L. Showen, Los Altos, CA (US);
Robert B. Calhoun, Oberlin, OH (US);
Jason W. Dunham, San Francisco, CA (US)

(73) Assignee: Shotspotter, Inc., Mountain View, CA (US)

( * ) Notice: Subject to any disclaimer, the term of this patent is extended or adjusted under 35 U.S.C. 154(b) by 123 days.

(21) Appl. No.: 11/546,529

(22) Filed: Oct. 10, 2006

(65) Prior Publication Data
US 2008/0084788 A1    Apr. 10, 2008

(51) Int. Cl.
*G01S 3/80* (2006.01)
(52) U.S. Cl. ............................................. 367/127
(58) Field of Classification Search ............... 367/124, 367/127, 129, 906; 342/368–377
See application file for complete search history.

(56) References Cited

U.S. PATENT DOCUMENTS

| | | | |
|---|---|---|---|
| 5,586,086 A | 12/1996 | Permuy et al. | |
| 5,973,998 A | 10/1999 | Showen et al. | |
| 6,178,141 B1 | 1/2001 | Duckworth et al. | |
| 6,552,521 B1 * | 4/2003 | Medelius et al. | 324/72 |
| 6,847,587 B2 | 1/2005 | Patterson et al. | |
| 6,891,500 B2 * | 5/2005 | Hall et al. | 342/465 |
| 2008/0084788 A1 * | 4/2008 | Showen et al. | 367/127 |

OTHER PUBLICATIONS

Li Cong, et al., "Hybrid TDOA/AOA Mobile User Location for Wideband CDMA Cellular Systems", IEEE Transactions on Wireless Communications, vol. 1 No. 3, Jul. 2002, pp. 439-447.*
Proietti, Mario, "Carrier Choices in Location: The System Integrator's View," GPS World, Mar. 2002, pp. 23-28.*

* cited by examiner

*Primary Examiner*—Dan Pihulic
(74) *Attorney, Agent, or Firm*—DLA Piper LLP (US)

(57) ABSTRACT

A gunshot location system computes candidate gunshot locations [314] from angle-of-arrival information [304, 308] and time-of-arrival information [312] provided by acoustic sensors [300, 302]. In addition to an angle, each sensor calculates an angular uncertainty [306, 310] from impulses received at four or more microphones having rotational symmetry. An intersection of one or more time-of-arrival hyperbolas with one or more angle-of-arrival beams [322] is used to determine a candidate gunshot location. In simple environments, a location can be confirmed with just two sensors allowing sensor density to be significantly reduced, while in complex environments including reflections, blocking, and interfering acoustic events, the additional angle-of-arrival information improves location accuracy and confidence, allowing elimination of candidate locations inconsistent with the combined time-of-arrival and angle-of-arrival information.

24 Claims, 6 Drawing Sheets

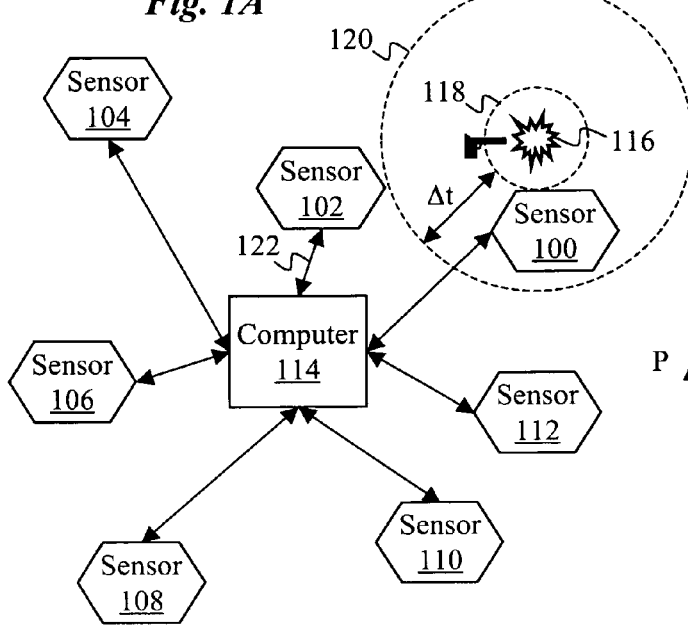
*Fig. 1A*
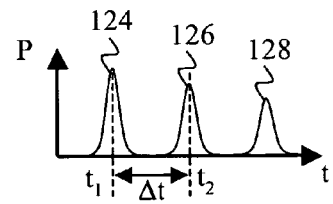
*Fig. 1B*
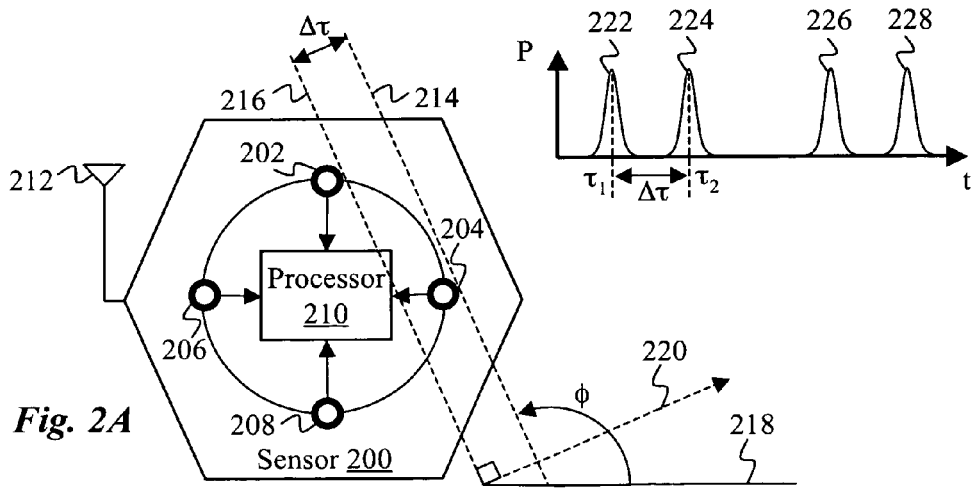
*Fig. 2A*
*Fig. 2B*

TOA
AOA
TOA+AOA

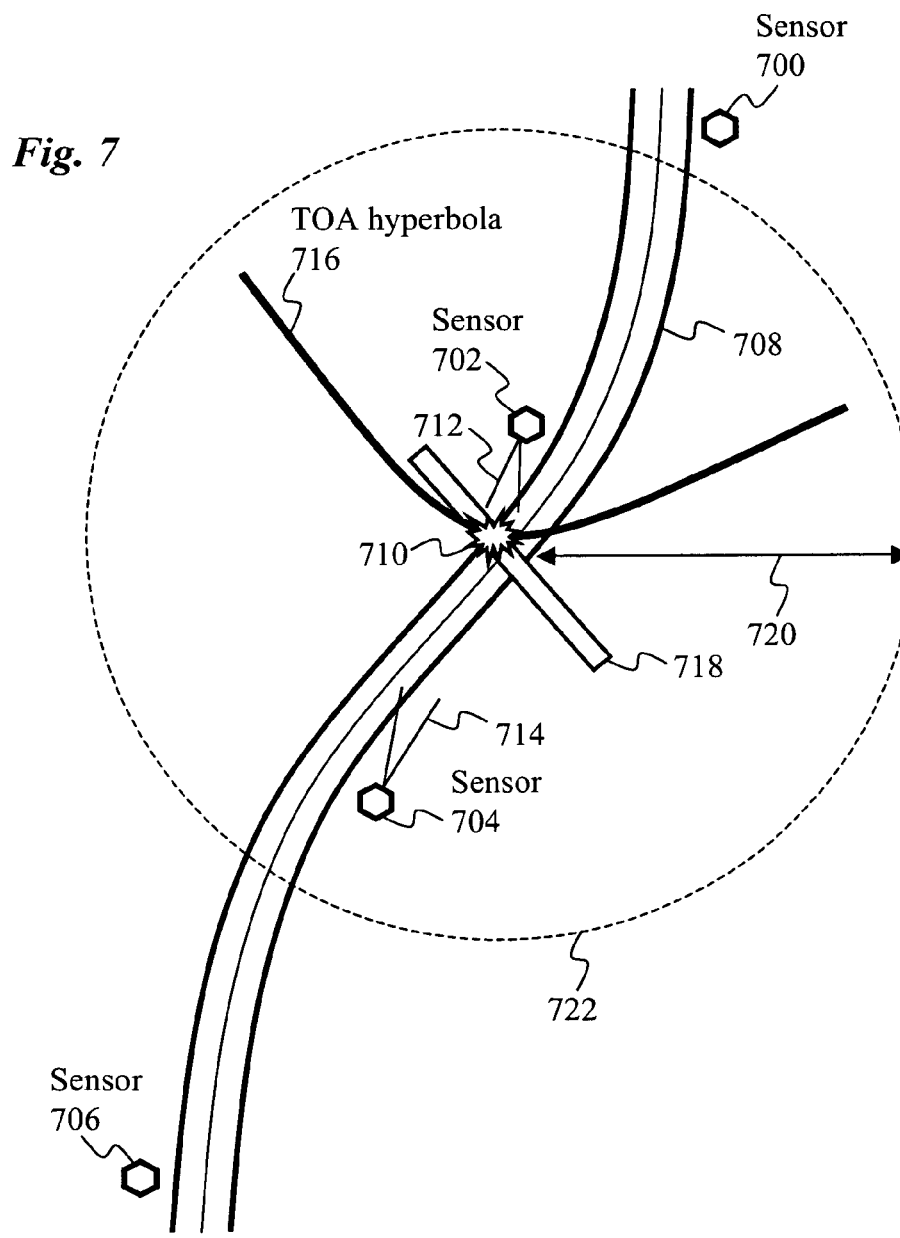

ACOUSTIC LOCATION OF GUNSHOTS USING COMBINED ANGLE OF ARRIVAL AND TIME OF ARRIVAL MEASUREMENTS

FIELD OF THE INVENTION

The present invention relates generally to systems and methods for locating gunshots and similar explosive acoustic events. More specifically, it relates to real-time gunshot location systems using a network of acoustic sensors distributed throughout a geographical region.

BACKGROUND OF THE INVENTION

Gunshot location systems have been used in various municipalities to assist law enforcement agencies in quickly detecting and responding to incidents of urban gunfire. The details of two such gunshot location systems are described in U.S. Pat. No. 5,973,998 to Showen et al. and U.S. Pat. No. 6,847,587 to Patterson et al., both of which are incorporated herein by reference. Showen's system locates gunshot events using a network of acoustic sensors with an average neighboring sensor separation of approximately 2000 feet. A computer receives acoustic signals from the sensors and triangulates a location, e.g., using relative time-of-arrival (TOA) information and/or angle-of-arrival (AOA) information of signals received from at least three sensors. A sensor may obtain an angle of arrival by measuring phase differences between very closely spaced microphones at the sensor site. Angles of arrival may be used to confirm a triangulated location by requiring a match between an intersection of angles and the triangulated location. Showen et al. also teach techniques for selecting a best triad of sensor signals to use in triangulation, e.g., selecting the triad that has the most number of confirming events from other sensors, selecting the triad that has the most widely-spread direction vectors, selecting the triad that has the largest total signal sharpness (or impulsiveness), and selecting the triad that gives the most central location among other candidate locations from other triads.

In complex urban environments, acoustic signals often experience reflections, refraction, and complete blockage from buildings and other objects, resulting in missing or misleading signals at sensors. Additionally, short-range signals like hammering can produce confusion. Consequently, in such environments it can be difficult to triangulate gunshot locations with accuracy and confidence. There thus remains a need to provide improved gunshot location systems that meet these challenges.

SUMMARY OF THE INVENTION

The present invention provides a gunshot location system that uses angular information together with TOA information from a collection of sensors to compute candidate gunshot locations. The sensors include one or more azimuthal sensors which provide angular information (e.g., AOA or information from which AOA may be derived). In preferred embodiments, the azimuthal sensor can also provide an angular uncertainty (i.e., beam width). Use of this enhanced AOA information permits more sophisticated and reliable determination of candidate gunshot locations.

In a preferred embodiment, each azimuthal sensor has four or more microphones equally spaced on a circumference of a circle. The sensor or other processor can determine from the four impulse arrival times a mean angle and standard deviation associated with the angle, both of which may be calculated from combinations of impulse arrival times from different triads of the four or more microphones. Preferably, the enhanced AOA information is computed by the azimuthal sensors and sent from the sensors via communication links to a computer which calculates the candidate gunshot locations. Alternatively, the sensors may send AOA information in the form of impulse arrival times to the computer which then calculates the angle of arrival.

The system includes first and second acoustic sensors, each communicating TOA information derived from acoustic impulses sensed at the sensor. At least one sensor also communicates enhanced AOA information derived from acoustic impulses sensed at the sensor, e.g., an azimuthal angle value and an angular uncertainty value or timing information from which these values may be derived. The computer receives the TOA information from the first and second acoustic sensors and computes a hyperbola consistent with the TOA information from the two sensors. The computer also receives the AOA information from at least one of the acoustic sensors and computes an angular beam consistent with the enhanced AOA information. An intersection of the hyperbola and the angular beam is then determined, and a candidate gunshot location within the intersection is computed.

In preferred implementations, both TOA and AOA information is provided from at least two sensors. By combining enhanced AOA information with TOA information from two sensors, the second beam may be used to confirm a location determined from the first beam and hyperbola. Thus, candidate locations may be confirmed with just two sensors.

This is a significant improvement over prior systems without azimuthal sensors which required four sensors to locate and confirm a gunshot event.

AOA and/or TOA information from additional acoustic sensors may be included to further improve accuracy and/or confidence in the candidate location. Consequently, the present system provides improved performance in complex acoustic environments. Alternatively, the sensor spacing may be increased if the environment is not acoustically complex, reducing the required sensor density and decreasing the expense of deploying a network of sensors over a defined coverage area. In implementations of the system where the sensors are positioned next to a roadway in an approximately linear arrangement, the use of the AOA information together with the TOA information allows the nearest neighbor distance between sensors to be increased to approximately 75% to 100% of the maximum range of sensor detectability.

Methods for calculating candidate gunshot locations may use enhanced AOA information from one or more sensors in various ways to improve system performance. For example, AOA information from one sensor in the collection of acoustic sensors may be used to disregard TOA information from that sensor if the AOA information is inconsistent with the location of an event determined from other sensors, which implies the signal arriving at the sensor was probably reflected. Alternatively, AOA information may be used to resolve an ambiguity in candidate locations computed when a detection using three sensors gives two mathematically valid triangulations.

In complex acoustic environments (e.g., involving blocked and reflecting paths plus additional short-range interfering signals), both TOA and AOA information provided from four or more sensors may be combined to select among various candidate gunshot locations. For example, for each of the candidate gunshot locations, the number of consistent TOA impulses and AOA directions received from the collection of acoustic sensors may be counted. The candidate gunshot locations can then be prioritized based on the counted impulses or directions, with highest priority given to the location with the largest number of consistent counts. With the addition of AOA information, either the number of redundant acoustic paths needed to decide between alternative location solutions can be reduced or the certainty of selection with the same number of paths can be improved.

BRIEF DESCRIPTION OF THE DRAWINGS

FIG. 1A is a schematic overview of a gunshot location system, according to an embodiment of the invention.

FIG. 1B is a graph of power vs. time illustrating acoustic impulses derived from a single gunshot event as sensed at different times by three sensors in a sensor network, according to an embodiment of the invention.

FIG. 2A is a schematic diagram of an acoustic sensor containing four microphones which receive acoustic impulses derived from a single gunshot event at slightly different times, thereby determining an angle of arrival at the sensor, according to an embodiment of the invention.

FIG. 2B is a graph of power vs. time illustrating acoustic impulses derived from a single gunshot event as sensed at different times by four microphones in a single sensor, according to an embodiment of the invention.

FIG. 7 is a diagram illustrating four sensors positioned in a substantially linear arrangement alongside a roadway, where AOA and TOA information from just two sensors may be used to compute and confirm a candidate gunshot location, according to an embodiment of the invention.

DETAILED DESCRIPTION

Figure 3A:
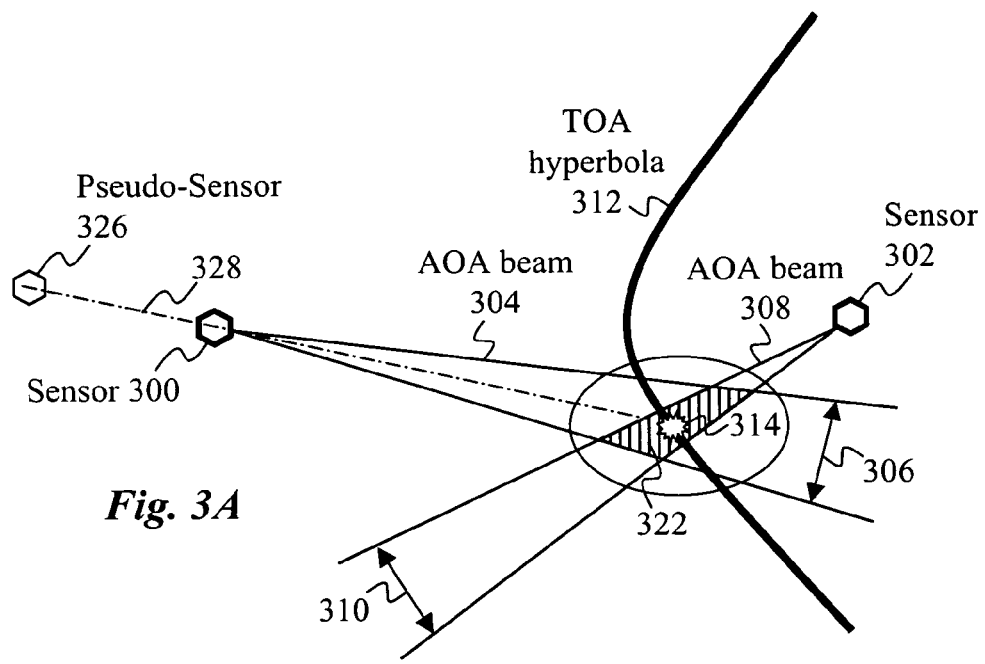
FIG. 3A is a diagram illustrating two sensors providing AOA and TOA information defining two AOA beams and a TOA hyperbola whose intersections provide a location of a gunshot event, according to an embodiment of the invention.

A gunshot location system according to a preferred embodiment of the invention is shown in FIG. 1A. The system includes a collection of acoustic sensors 100, 102, 104, 106, 108, 110, 112 having known locations (either fixed and predetermined or variable and determined as needed using GPS or other positioning technology). Each sensor is preferably positioned so that it has line-of-sight exposure to a large portion of the surrounding area (e.g., attached to a tower or telephone pole). Each sensor is capable of sensing acoustic events in the environment and communicating information related to the acoustic events to a computer 114 via communication links such as link 122. The communication link 122 may be wired, wireless, or a combination of wired and wireless. The information communicated from the sensors to the computer 114 may take the form of digital or analog signals communicated using a suitable modulation scheme. The computer 114 may be positioned near the network of sensors, or may be remotely positioned. The computer 114 may be at a fixed location, or may be portable.

An exemplary gunshot event 116 generates an acoustic impulse that radiates outward from its originating location. At time $t_1$, the impulse has position 118 and is sensed by sensor 100. At a later time $t_2$, the impulse has position 120 and is sensed by sensor 102. Computer 114 receives TOA information $t_1$ and $t_2$ from sensors 100 and 102 and is able to compute a time difference $\Delta t$ between times $t_1$ and $t_2$. FIG. 1B is a graph of power vs. time illustrating the acoustic impulses 124 and 126 as sensed at $t_1$ and $t_2$ by sensors 100 and 102, respectively. The further delayed impulse 128 is from a still more distant sensor, say 112. At least one of sensors 100 and 102 also provides enhanced AOA information, such as an azimuth angle $\phi$ and an angular uncertainty or impulse timing data from which these values may be derived, as will now be described in more detail in relation to FIGS. 2A and 2B.

An acoustic sensor according to a preferred embodiment of the invention is shown in FIG. 2A. The sensor 200 includes four microphones 202, 204, 206, 208, which detect acoustic impulses and communicate them to a digital signal processor 210 using wired connections. Processor 210 may include signal amplification and analog-to-digital conversion, as appropriate, to sample the audio signals at a sampling rate (e.g., at 40 kHz or higher) and process the resulting digitized data. In a preferred embodiment, TOA and AOA information derived from the acoustic impulses is computed by the processor and wirelessly transmitted from the sensor using antenna 212. The TOA information may include, for example, the time-of-arrival of an impulse at one microphone that detects the impulse, e.g., the first microphone to detect the impulse or a predetermined microphone.

Although only three microphones are required to compute a horizontal angle of arrival, sensor 200 preferably contains four or more microphones which enables the sensor to include an angular uncertainty value with the AOA information. An acoustic impulse derived from a single gunshot event has an angle of arrival $\phi$ at the sensor. Because the spacing between the microphones (typically less than one foot) is much smaller than the distance from the sensor to the gunshot (typically hundreds or thousands of feet), the acoustic impulse is well-approximated as a plane wave. In the example shown, the acoustic impulse is first sensed by microphone 204 when the impulse wave front is in position 214 at time $\tau_1$. At time $\tau_2$, the impulse wave front has position 216 and is sensed by microphone 202. Processor 210 receives acoustic impulse signals from the microphones and determines impulse arrival times $\tau_1$ and $\tau_2$. Similarly, impulse arrival times are also determined from signals received from microphones 206 and 208. A graph of the four signals 222, 224, 226, 228 received at processor 210 from microphones 204, 202, 208, 206, respectively, is shown in FIG. 2B.

The four microphones have predetermined fixed positions within the sensor in a horizontal plane, and the sensor is oriented at a predetermined angle. Thus, processor 210 is able to compute the angle $\phi$ 220 toward the source of the impulse relative to a reference orientation line 218 of the sensor. The orientation line 218 is predetermined and fixed upon installation or may be determined in real time from a compass, GPS receiver, or other similar means. According to one embodiment, processor 210 computes four angles of arrival, each using the signals from a different triad of sensors. The azimuth angle φ is the mean of the four angles, while the angular uncertainty is the standard deviation of the four angles. According to another embodiment, a matrix inversion technique with inputs from all microphones is used to calculate the most consistent input angle assuming a plane wave. A further method is to cross-correlate each microphone signal against the signal from the reference microphone signal and use the maximum value of the cross-correlation to determine the time offsets. Yet another method is to cross-correlate each signal against a synthetic signal (not from any of the microphones). An advantage here is that there is less susceptibility to common-mode noise (e.g., loud 60 Hz noise from a nearby transformer).

These techniques easily generalize to embodiments in which more than four microphones are used to provide more precision in the angle measurement. The sensor microphones are preferably positioned so that they are equally spaced on a circumference of a circle. In the case of four sensors, this is equivalent to positioning the sensors at the corners of a square. More generally, the sensors are positioned isotropically in a rotationally symmetric arrangement, i.e., at the vertices of a regular polygon.

In an alternate embodiment, some or all of the computations performed by processor 210 as described above may instead be performed by at computer 114 (FIG. 1A). For example, a sensor may send to the computer timing data associated with each impulse arriving at each of its microphones. The computer then performs the calculation of azimuthal angle and angular uncertainty from this timing data, using any of the techniques as described above.

Figure 3B:
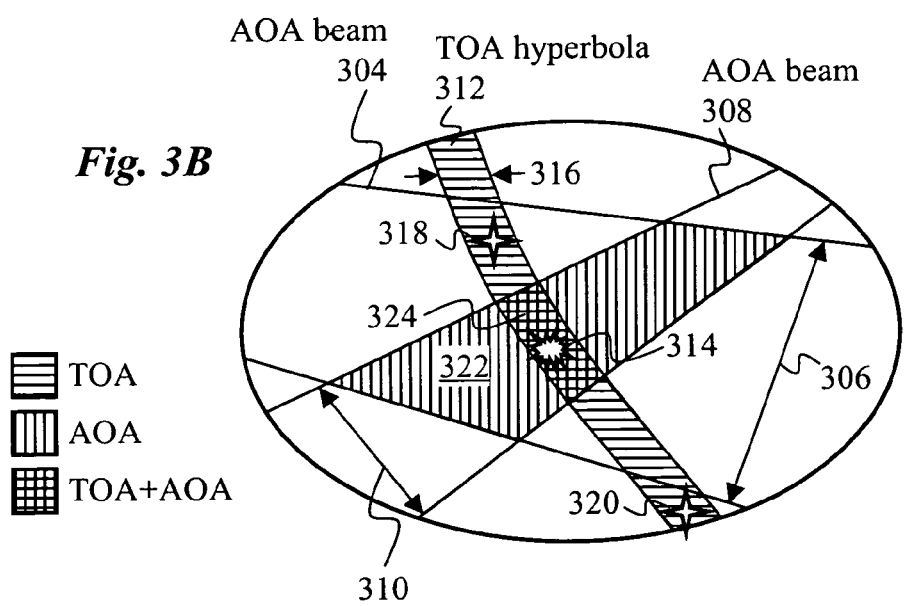
FIG. 3B is a detail view of a region where the two AOA beams and the TOA hyperbola of FIG. 3A intersect.

FIG. 3A illustrates two sensors 300, 302 providing AOA and TOA information which define two AOA beams 304, 308 and a TOA hyperbola 312. The gunshot event 314 is located within the intersection of the two AOA beams and the TOA hyperbola. The angular uncertainty of beam 304 defines a beam width 306. Similarly, the angular uncertainty of beam 308 defines a beam width 310. FIG. 3B shows in more detail the region 322 where AOA beams 304 and 308 intersect with each other. Also shown is a portion of TOA hyperbola 312 which intersects the AOA region 322 in a smaller region 324 containing gunshot event 314. Without AOA information, candidate gunshot locations could be anywhere on TOA hyperbola 312. For example, candidate location 320 is on hyperbola 312 but not within either AOA beam. With AOA information from one beam, the candidate location may be further restricted. For example, if AOA information from beam 304 is known, then candidate location 320 may be excluded from consideration. Candidate location 318, however, is in the intersection of beam 304 and hyperbola 312. With AOA information from both beams, even more accuracy is provided. For example, the two-dimensional region 322 which represents the intersection of both beams 304 and 308 with hyperbola 312, eliminates from consideration both candidate locations 320 and 318. Thus, the use of AOA information permits more accuracy and allows the elimination of some candidate locations. Once a small region is determined from intersections, a candidate location may be selected, for example, by computing a centroid of the region.

In addition, TOA information provided by the sensors also may include temporal uncertainty caused by refraction of the impulses during propagation, resulting in a width 316 of TOA hyperbola 312. From experimentation, typical suburban environments will produce temporal propagation errors averaging approximately 20 feet. Urban environments with buildings having more than two stories will have larger average errors. Thus, the TOA information also defines a two-dimensional region rather than a one-dimensional curve. The intersection of multiple two-dimensional regions typically results in smaller two-dimensional regions, providing increased accuracy as more information is available. The intersection of multiple one-dimensional curves, in contrast, is overly restrictive in many cases and results in a null set.

An alternative method to calculate the position of a source using two or more azimuthal sensors (as was illustrated in FIG. 3A) relies on a mathematical artifact, a "pseudosensor". In this embodiment, a given sensor can be virtually translated along the line determined by the angle-of-arrival detected by the sensor. For example, FIG. 3A shows pseudosensor 326 derived by virtually translating actual sensor 300 along line 328 corresponding to the center of AOA beam 304. The distance moved along the line will determine a virtual time-of-arrival measurement corresponding to the time which an actual sensor at the translated position would have received an impulse from the source.

The distance moved divided by the sonic velocity is the change in arrival time between the actual sensor and the pseudosensor. Using this additional virtual measurement from the pseudosensor, the location of the source can be calculated using TOA data from the original and pseudo sensors using the original sensor position and the pseudosensor position. The potential advantage of this method is that it permits calculation of the source location using only a TOA algorithm instead of a mixed algorithm requiring both TOA and AOA data.

Figure 4:
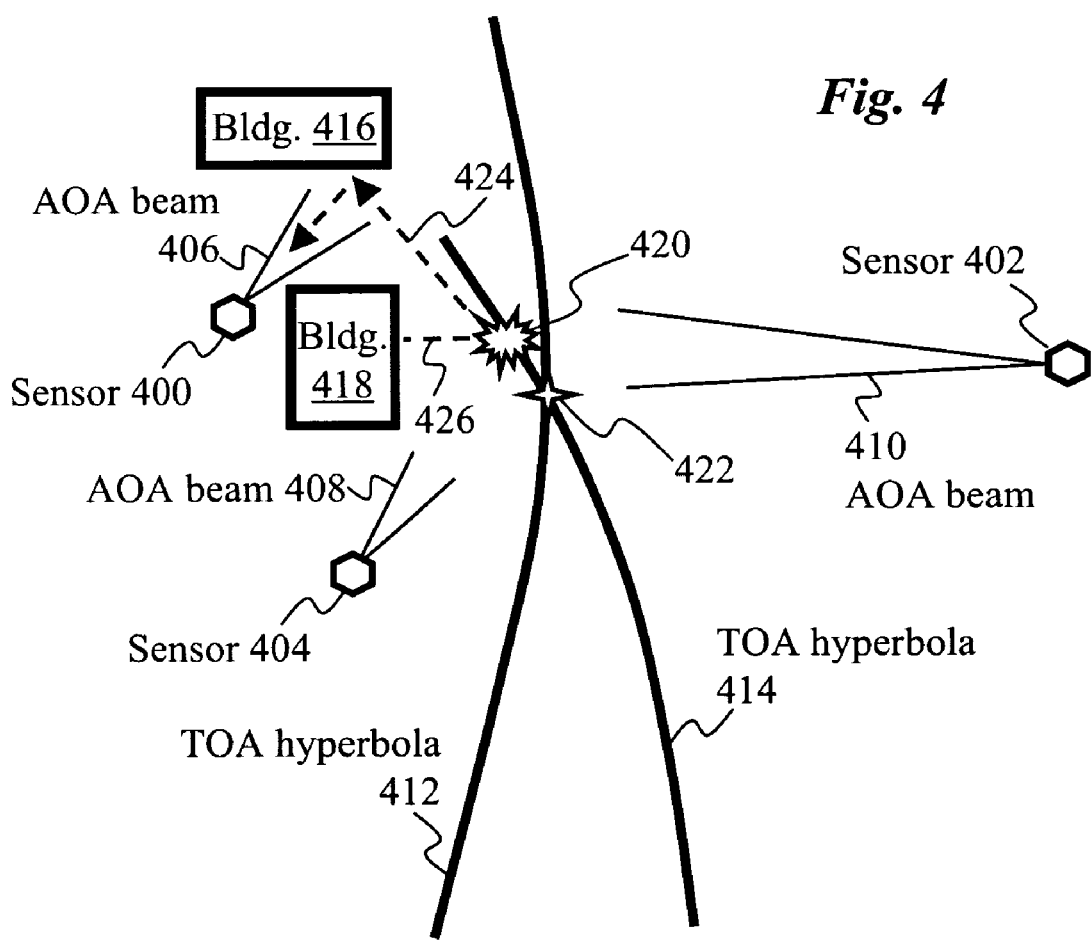
FIG. 4 is a diagram illustrating three sensors providing AOA and TOA information relating to a gunshot event, where incorrect AOA information at one of the sensors due to a reflection is used to disregard TOA information from the sensor, according to an embodiment of the invention.

Urban environments often contain buildings and other objects that can block and/or reflect acoustic impulses as they propagate from a source to the sensors. Consequently, sensors detecting reflected impulses will report incorrect AOA and TOA information. For example, FIG. 4 is a diagram illustrating three sensors 400, 402, 404 providing AOA and TOA information relating to a gunshot event 420. Buildings 416 and 418 in the environment interfere with the propagation of the impulses to sensor 400. In particular, the impulse following direct path 426 is blocked while the impulse following reflected path 424 is detected instead. Due to the artificially increased propagation time to sensor 400, TOA hyperbola 412 (derived from sensors 400 and 402) is displaced from its correct position. Consequently, the candidate gunshot location 422, found from the intersection of TOA hyperbola 412 with TOA hyperbola 414 (derived from sensors 402 and 404), is also displaced. However, the consideration of AOA information allows this displacement to be detected and corrected. In particular, note that although AOA beams 408 and 410 are consistent with both the location of the actual gunshot event 420 and the candidate location 422, AOA beam 406 from sensor 400 is not. Thus, identifying such incorrect AOA information at one of the sensors may be used to disregard TOA information from that sensor. In the example shown, since the AOA information from sensor 400 is inconsistent with the candidate location 422 and the AOA information from sensors 402 and 404, the information from sensor 400 is disregarded as inaccurate. The TOA and AOA information from sensors 402 and 404 may then be used to calculate the correct location, as discussed in FIGS. 3A-B using two sensors.

Figure 5:
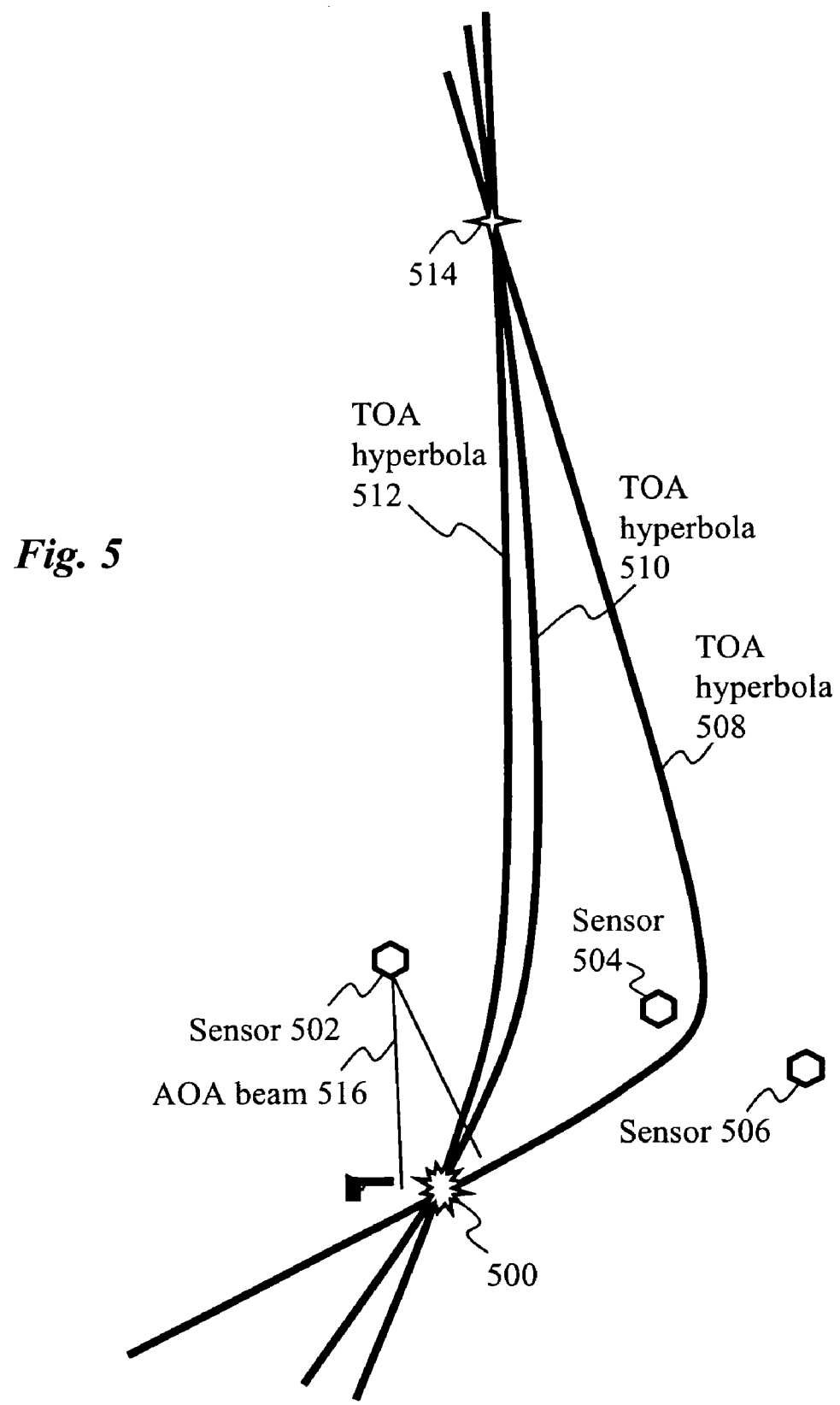
FIG. 5 is a diagram illustrating three sensors providing AOA and TOA information relating to a gunshot event, where AOA information at one of the sensors is used to resolve an ambiguity between two candidate locations determined from TOA information, according to an embodiment of the invention.

AOA information may be used to resolve an ambiguity arising from multiple solutions to the intersection of TOA hyperbolas, as illustrated in FIG. 5. Three sensors 502, 504, 506 forming a very oblique triad provide TOA information relating to a gunshot event 500, resulting in TOA hyperbola 508 (derived from sensors 504 and 506), hyperbola 510 (derived from sensors 502 and 506), and hyperbola 512 (derived from sensors 502 and 504). Due to the nearly linear arrangement of the sensors, the three hyperbolas intersect at candidate location 514 as well as actual gunshot location 500 providing two mathematically plausible solutions. AOA information at one of the sensors, however, may be used to resolve this ambiguity between two candidate locations determined from TOA information alone. In particular, AOA beam 516 is not consistent with candidate location 514 and confirms actual location 500. Thus, AOA information from sensor 502 can be used to eliminate candidate location 514. AOA information from any one of the other sensors would also suffice to resolve the ambiguity, and their beam intersections might further limit the size of the location error from obliquely intersecting hyperbolae.

As discussed earlier, complex environments may contain buildings that block and/or reflect acoustic impulses and cause sensors to provide misleading information. In addition, complex environments may also contain interfering impulsive events other than gunshots (e.g., hammer strikes and bouncing basketballs). AOA information can be effectively combined with TOA information in such environments to improve the probability of correctly locating gunshots. For example, FIG. 6A is a diagram illustrating five sensors 600, 602, 604, 606, 608 in a complex acoustic environment containing reflections of impulses 634 and 636 from buildings 620 and 622, respectively, blocking by building 620, and a weak impulsive event 626. Gunshot event 624 is detected by all five sensors. In addition, sensor 608 detects the hammer at 626. Sensor 604 detects both a direct impulse as well as reflected impulse 634 while sensor 606 detects only a reflected impulse 636.

Figure 6B:
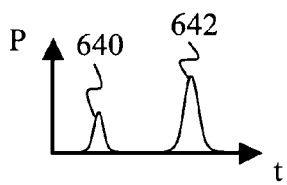
FIGS. 6B-F are graphs of power vs. time illustrating acoustic impulses as sensed at different times by the five sensors shown in FIG. 6A.
Figure 6C:
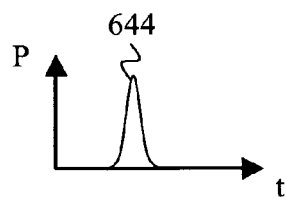
Figure 6D:
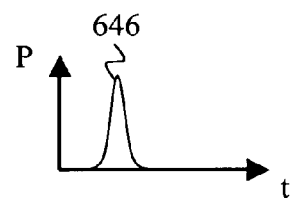
Figure 6A:
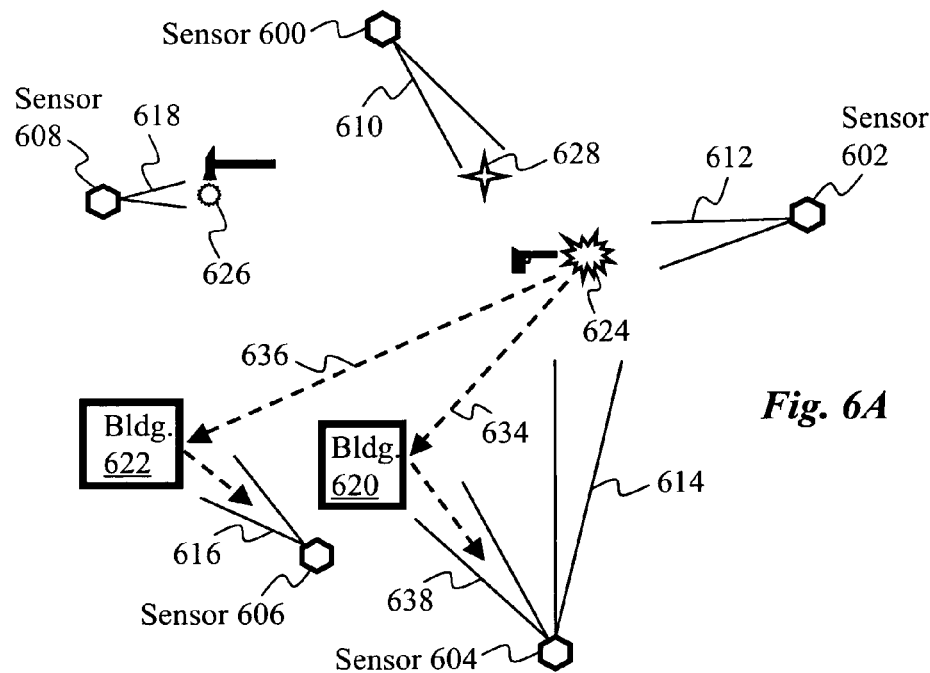
FIG. 6A is a diagram illustrating five sensors in a complex acoustic environment containing reflections, blocking, and a false local event, where counting AOA and TOA impulses at all the sensors may be used to prioritize candidate gunshot locations.
Figure 6E:
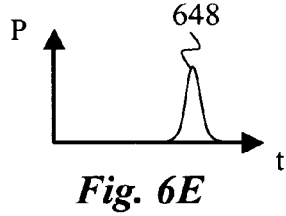
Figure 6F:
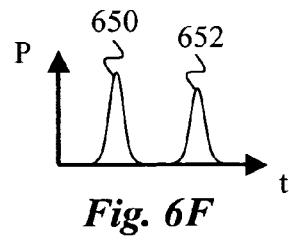

FIGS. 6B-6F show graphs of power vs. time illustrating acoustic impulses as sensed at different times by the five sensors. In particular, FIG. 6B shows impulse 640 due to the hammer at 626 and impulse 642 due to the gunshot event 624, as detected by sensor 608. FIG. 6C shows impulse 644 due to the gunshot event 624, as detected by sensor 600. FIG. 6D shows impulse 646 due to the gunshot event 624, as detected by sensor 602. FIG. 6E shows impulse 648 due to the gunshot event 624 and delayed due to reflection from building 622, as detected by sensor 606. FIG. 6F shows impulse 650 due to the gunshot event 624 and impulse 652 due to the gunshot event 624 but delayed due to reflection from building 620, as detected by sensor 604. The sensors also obtain AOA beams corresponding to the impulses. In particular, sensor 600 measures beam 610, sensor 602 measures beam 612, sensor 604 measures beams 614 and 638, sensor 606 measures beam 616, and sensor 608 measures beam 618. Note that beams 616 and 638 are derived from reflected impulses and are not directed toward the actual gunshot location 624. Beam 618, however, coincidentally is directed toward both the actual gunshot location 624 as well as the hammer at 626.

In situations such as that shown in FIG. 6A, where four or more sensors detect impulses in a complex environment with unknown reflections, blocking, and uncorrelated local impulses, AOA information from the sensors is especially useful when calculating candidate gunshot locations. According to one embodiment of the invention, multiple candidate gunshot locations are calculated from TOA information and then prioritized using TOA and AOA information as given in Table 1. For example, FIG. 6A shows both the actual gunshot event 624 and a candidate gunshot location 628, each calculated from TOA information from a different triad. In particular, location 624 is calculated from TOA information associated with impulses 644, 646, 650, from sensors 600, 602, 604, respectively. Candidate location 628, on the other hand, is calculated from TOA information associated with impulses 644, 652, 642, from sensors 600, 604, 608. The time data from sensor 606 is discarded because its azimuth does not point to either of the two candidate locations. These two calculated locations may be prioritized by counting the number of TOA impulses and AOA directions received at each sensor for each candidate location, and then totaling the "votes" received by each candidate. Table 1 below shows the counting for the example shown in FIG. 6A.

TABLE 1

|  | Actual Location 624 | | Candidate Location 628 | |
| --- | --- | --- | --- | --- |
|  | TOA | AOA | TOA | AOA |
| Sensor 600 | X | X |  | X |
| Sensor 602 | X | X |  |  |
| Sensor 604 | X | X | X |  |
| Sensor 606 |  |  |  |  |
| Sensor 608 |  | X | X | X |
| Total Votes | 7 | | 4 | |

After the events for each sensor are counted, candidate gunshot locations can then be prioritized based on the counted events, with highest priority given to the location with the largest number of votes. In the example shown, the actual location 624 obtained seven votes, while the candidate location 628 obtained only four. Consequently, location 624 is selected. This vote-counting method has the advantage that it may be applied generally to complex situations with unknown reflections, blocking, and false impulses detected by four or more sensors. A refinement of this scheme would allow the number of votes accorded to each AOA or TOA datum to be weighted by the reliability of the measurement. The more sensors with signals available to give more redundant paths and azimuths the better, up to a point where the sensors are so close together that a weak (non-gunfire) source can register on two sensors, in which case the benefit of a spatial filter is not achieved.

All prior discussions have concerned coverage over an area. Another benefit of the present invention is where a substantially linear coverage as along a highway is desired.

In the context of the present disclosure, a "substantially linear" arrangement of sensors is used to mean a sequential arrangement of sensors where the triangle formed by connecting a sequence of three adjacent sensors has a smallest angle no larger than 30 degrees. For example, FIG. 7 illustrates an implementation of the system where sensors 700, 702, 704, 706 are positioned next to a roadway 708 in an approximately linear arrangement. Gunshot events in such environments often occur on an overpass or bridge across the roadway, such as gunshot event 710 on overpass 718. Sensors 702 and 704 nearest event 710 detect associated acoustic impulses and provide TOA information used to compute TOA hyperbola 716. In addition, sensors 702 and 704 also provide AOA information corresponding to beams 712 and 714, respectively. This AOA information may be combined with the TOA information to locate and confirm gunshot event 710, as described earlier in relation to FIGS. 3A-B. Because the use of the AOA information in addition to the TOA information allows the event to be located and confirmed with only two sensors, the nearest neighbor distance between sensors may be increased to nearly the maximum range of event detectability. Hence the average sensor spacing can be approximately doubled compared with prior systems, thus reducing the expense of deploying a gunshot location system. Without the AOA information, the spacing would have to be approximately 40% to 50% of the maximum sensor range to allow four sensors to detect and locate the event. In a preferred embodiment, the nearest neighbor sensor spacing is 75% to 100% of the maximum range of event detectability by the sensors. For example, assuming the range at which an event can clearly be detected is about one mile, the sensor spacing can be increased from about 2500 feet to approximately 5000 feet.

The invention claimed is:

1. A method for computing gunshot locations, the method comprising:
    communicating from a first acoustic sensor to a computer i) time-of-arrival information derived from acoustic impulses sensed at the first acoustic sensor and ii) angle-of-arrival information derived from the acoustic impulses sensed at the first acoustic sensor,
    communicating from a second acoustic sensor to the computer time-of-arrival information derived from acoustic impulses sensed at the second acoustic sensor;
    computing time-of-arrival information for a pseudosensor from the angle-of-arrival information and time-of-arrival information communicated from the first acoustic sensor;
    computing a candidate gunshot location from the time-of-arrival information from the first and second acoustic sensors and the pseudosensor.

2. The method of claim 1 further comprising
    computing a hyperbola from the time-of-arrival information, computing an angular beam from the angle-of-arrival information, and computing a candidate gunshot location from an intersection of the hyperbola and the angular beam.

3. The method of claim 2 further comprising:
    computing a second angular beam from angle-of-arrival information communicated from the second acoustic sensor, and confirming gunshot location from an intersection of the hyperbola, the first angular beam, and the second angular beam.

4. The method of claim 1 further comprising:
    communicating time-of-arrival information derived from acoustic impulses sensed at a third acoustic sensor and angle-of-arrival information derived from the acoustic impulses sensed at the third acoustic sensor;
    computing a candidate location from the time-of-arrival communicated from the first, second and third acoustic sensors; and
    discarding time-of-arrival information from a sensor if the computed candidate location is not consistent with angle-of-arrival information derived from the sensor.

5. The method of claim 1, further comprising:
    communicating from a third acoustic sensor to the computer time-of-arrival information derived from acoustic impulses sensed at the third acoustic sensor and angle-of-arrival information derived from the acoustic impulses sensed at the third acoustic sensor;
    computing a candidate location from the time-of-arrival information communicated from the first, second and third acoustic sensors, and
    discarding time-of-arrival information from a sensor if an angular beam derived from angle-of-arrival information from a sensor is inconsistent with the candidate location.

6. The method of claim 1 wherein the pseudosensor is positioned along a line determined by a sensor position and a direction to a gunshot source.

7. The method of claim 6 wherein the pseudosensor is located on a side of the first sensor that is away from the gunshot source.

8. The method of claim 6 wherein the direction to the gunshot source corresponds to a center of an angle-of-arrival beam.

9. The method of claim 1 wherein the pseudosensor is positioned along a line determined by the angle-of-arrival information.

10. The method of claim 1 wherein the pseudosensor is located on a side of the first sensor that is away from a gunshot source.

11. The method of claim 1 further comprising using a virtual time-of-arrival measurement, which is derived as a function of a distance along a line between the first sensor and the pseudosensor, to locate a gunshot.

12. The method of claim 1 further comprising computing second time-of-arrival information for a second pseudosensor from the angle-of-arrival information and time-of-arrival information communicated from the second acoustic sensor.

13. The method of claim 12 further comprising confirming gunshot location using a virtual measurement associated with the second pseudosensor.

14. The method of claim 1 further comprising computing multiple candidate locations of a detected gunshot from the time-of-arrival and angle-of-arrival information communicated from the acoustic sensors, and selecting a best candidate location for the detected gunshot from among the computed candidate locations, wherein the selected candidate location has a largest number of compatible time-of-arrival impulses and angle-of-arrival directions received from the acoustic sensors.

15. The method of claim 1 further comprising:
    converting angle-of-arrival information into time-of-arrival information via use of one or more pseudosensors, including calculating arrival times consistent with the angle-of-arrival information; and
    calculating a gunshot location using an algorithm that requires only time of arrival data.

16. A gunshot location system comprising a collection of at least three acoustic sensors, a computer for computing gunshot locations using information communicated from the acoustic sensors, and communication links connecting the acoustic sensors to the computer,
    wherein the acoustic sensors communicate to the computer time-of-arrival information and angle-of-arrival information derived from acoustic impulses sensed at the acoustic sensors,
    wherein the computer for computing gunshot locations computes multiple candidate locations of a detected gunshot from the time-of-arrival and angle-of-arrival information communicated from the acoustic sensors, and selects a best candidate location as an actual gunshot location from among the computed candidate locations, wherein the best candidate location has a larger quantity of compatible time-of-arrival impulse and angle-of-arrival directions events from the acoustic sensors, than comparable quantities of compatible events associated with one or more false candidate gunshot locations.

17. The system of claim 16 wherein an acoustic sensor comprises three or more microphones spaced on a circumference of a circle.

18. The system of claim 16 wherein the first acoustic sensor comprises three or more microphones and a signal processor connected to the microphones, and wherein the signal processor calculates an azimuth from time-of-arrival information of the acoustic impulses arriving at the microphones.

19. A method computing gunshot locations, the method comprising:

communicating from a first acoustic sensor to a computer i) time-of-arrival information derived from acoustic impulses sensed at the first acoustic sensor and ii) angle-of-arrival information derived from the acoustic impulses sensed at the first acoustic sensor, communicating from a second acoustic sensor to the computer time-of-arrival information derived from acoustic impulses sensed at the second acoustic sensor;

computing a hyperbola from the time-of-arrival information communicated from the first and second acoustic sensors;

calculating an azimuth and an annular uncertainty from time-of-arrival information of acoustic impulses arriving at four or more microphones of the first acoustic sensor;

computing an angular beam from the angle-of-arrival information communicated from the first acoustic sensor, and computing a candidate gunshot location from an intersection of the hyperbola and the angular beam;

wherein calculating the azimuth and the angular uncertainty comprises calculating azimuths from different triads of the acoustic impulses and calculating a mean and standard deviation from the calculated azimuths.

20. The method of claim 19 wherein the microphones are spaced on a circumference of a circle.

21. The method of claim 19 wherein the microphones are positioned at corners of a square.

22. The method of claim 19 wherein the microphones are positioned isotropically.

23. The method of claim 19 wherein the microphones are positioned at vertices of a regular polygon.

24. A method for computing gunshot locations, the method comprising:

communicating to a computer time-of-arrival information and angle-of-arrival information derived from acoustic impulses sensed at a collection of at least three acoustic sensors;

computing multiple candidate locations of a detected gunshot from the time-of-arrival and angle-of-arrival information; and selecting a best candidate location as an actual gunshot location from among the computed candidate locations, wherein the best candidate location has a larger quantity of compatible time-of-arrival impulses and angle-of-arrival directions events from the acoustic sensors, than comparable quantities of compatible events associated with one or more false candidate gunshot locations.

* * * * *